United States Patent
Uribe et al.

(10) Patent No.: US 11,087,338 B2
(45) Date of Patent: Aug. 10, 2021

(54) IDENTIFYING SIMILAR ITEMS BASED ON GLOBAL INTERACTION HISTORY

(71) Applicant: NETFLIX, INC., Los Gatos, CA (US)

(72) Inventors: Carlos Alberto Gomez Uribe, Mountain View, CA (US); Vijay Bharadwaj, Belmont, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 16/681,730

(22) Filed: Nov. 12, 2019

(65) Prior Publication Data

US 2020/0082417 A1     Mar. 12, 2020

Related U.S. Application Data

(63) Continuation of application No. 13/590,071, filed on Aug. 20, 2012, now Pat. No. 10,475,050, which is a continuation-in-part of application No. 13/179,392, filed on Jul. 8, 2011, now Pat. No. 10,311,386.

(51) Int. Cl.
    *G06Q 30/02*      (2012.01)

(52) U.S. Cl.
    CPC ................................. *G06Q 30/0201* (2013.01)

(58) Field of Classification Search
    CPC .................................................. G06Q 30/0201
    USPC ........................................................ 705/7.29
    See application file for complete search history.

(56) References Cited

U.S. PATENT DOCUMENTS

| | | |
|---|---|---|
| 5,790,426 A | 8/1998 | Robinson |
| 6,266,649 B1 | 7/2001 | Linden et al. |
| 6,466,918 B1 | 10/2002 | Spiegel et al. |
| 7,403,910 B1 | 7/2008 | Hastings et al. |
| 7,970,644 B2 | 6/2011 | Hedley et al. |
| 8,055,655 B1 | 11/2011 | He et al. |
| 8,311,950 B1 | 11/2012 | Kunal et al. |
| 8,825,474 B1 | 9/2014 | Zhai et al. |
| 8,868,570 B1 | 10/2014 | Skut et al. |
| 9,129,214 B1 | 9/2015 | Gomez-Uribe et al. |

(Continued)

OTHER PUBLICATIONS

De Wit, Joost, "Evaluating Recommender Systems—An evaluation framework to predict user satisfaction for recommender systems in an electronic programme guide context" (online), May 16, 2008, University of Twente, Retrieved from the internet at URL: <http:l/eprints.eemcs.utwente.nl/13083/>.

(Continued)

*Primary Examiner* — Folashade Anderson
(74) *Attorney, Agent, or Firm* — Artegis Law Group, LLP

(57) ABSTRACT

One embodiment sets forth technique for computing a similarity score between two digital items is computed based on interaction histories associated with global users and interaction histories associated with local users. Global counts indicating the number of interactions associated with each unique pair of digital items are weighted based on a mixing rate. The weighted global counts are then combined with local counts to compute total counts. An effective interaction probability indicating the likelihood of a user interacting with one digital item in the pair of digital items after interacting with the other digital item in the pair is computed based on the total counts. The effective interaction probability is then corrected for noise, resulting in a similarity score indicating the similarity between the pair of digital items.

20 Claims, 4 Drawing Sheets

(56) References Cited

U.S. PATENT DOCUMENTS

| | | | |
|---|---|---|---|
| 9,727,644 B1* | 8/2017 | Teng | G06F 16/215 |
| 9,760,802 B2* | 9/2017 | Chen | G06Q 30/0257 |
| 9,792,640 B2* | 10/2017 | Meshulam | G06Q 30/0631 |
| 10,296,512 B1* | 5/2019 | Chandran | G06F 16/24578 |
| 10,346,900 B1* | 7/2019 | Wilson | G06F 3/04842 |
| 10,796,239 B2* | 10/2020 | Vahabi | G06F 16/9024 |
| 2004/0260600 A1 | 12/2004 | Gross | |
| 2006/0041548 A1 | 2/2006 | Parsons et al. | |
| 2007/0100680 A1 | 5/2007 | Kumar et al. | |
| 2008/0097821 A1 | 4/2008 | Chickering et al. | |
| 2010/0010877 A1 | 1/2010 | Hunt et al. | |
| 2010/0251305 A1 | 9/2010 | Kimble et al. | |
| 2010/0268661 A1 | 10/2010 | Levy et al. | |
| 2011/0173130 A1 | 7/2011 | Schaefer, IV et al. | |
| 2011/0184806 A1 | 7/2011 | Chen et al. | |
| 2012/0096013 A1 | 4/2012 | Ciancutti et al. | |
| 2012/0271805 A1 | 10/2012 | Holenstein et al. | |
| 2013/0013458 A1 | 1/2013 | Uribe et al. | |
| 2014/0208268 A1 | 7/2014 | Jimenez | |
| 2014/0380380 A1* | 12/2014 | Heller | H04N 21/47217 725/58 |
| 2015/0006544 A1* | 1/2015 | Isquith | G06F 16/435 707/748 |

OTHER PUBLICATIONS

Sawers (Netflix Never Used Its $1m Algorithm. Here's Why. Apr. 13, 2012).

Iskold (The Art, Science and Business of Recommendation Engines Jan. 16, 2007).

Wilson et al (How Netflix Works, from http://electronics.howstuffworks.com/netflix5.htm, unknown publication date, retrieved Jul. 8, 2013).

Mangalindan (Amazon's recommendation secret, from CNN Money, Jul. 30, 2012, retrieved Jul. 8, 2013).

Bustos, L. "Cross-Sells and Upsells: What is the Diff?" Jul. 6, 2009 available at http://www.getelastic.com/defining-cross-sellupsell/.

* cited by examiner

IDENTIFYING SIMILAR ITEMS BASED ON GLOBAL INTERACTION HISTORY

CROSS-REFERENCE TO RELATED APPLICATIONS

This application is a continuation of the co-pending U.S. patent application titled, "IDENTIFYING SIMILAR ITEMS BASED ON GLOBAL INTERACTION HISTORY," filed on Aug. 20, 2012 and having application Ser. No. 13/590,071, which is a continuation-in-part of the U.S. patent application titled, "IDENTIFYING SIMILAR ITEMS BASED ON INTERACTION HISTORY," filed on Jul. 8, 2011 and having application Ser. No. 13/179,392. The subject matter of these related applications is hereby incorporated herein by reference.

BACKGROUND OF THE INVENTION

Field of the Invention

The present invention relates generally to online content distribution and, more specifically, to identifying similar items based on global interaction history.

Description of the Related Art

Conventional digital content distribution systems include a content server, an application, a content player, and a communications network connecting the content server to the content player. The content server is configured to store digital content items corresponding to different content titles that can be downloaded from the content server to the content player. The application allows a user of the content player to browse through available digital content and manage account information, etc.

Typical digital content distribution systems offer a large variety of digital media to the user for viewing. In order to enhance the user experience, content distribution systems often personalize digital media recommendations to the individual user. One approach to recommending digital media involves identify digital media that is similar to digital media previously viewed by the user. Such a recommendation system typically involves attaching meta-data tags to digital media, such that digital media having the same meta-data tags are deemed to be similar. However, given the large variety of digital media available, thousands of meta-data tags are needed to accurately describe the contents of digital media. Managing the meta-data tags and performing similarity computations based on the multitude of tags is computationally and storage space intensive. In addition, because meta-data tags are often attached to digital media based on the perception of an individual, the tags may not accurately describe the contents of the digital media, and, therefore, any similarity computation performed based on the tags may not be accurate. Lastly, the set of meta-tags that optimally determine similarity of digital media and/or the extent to which each tag should contribute to this similarity typically varies depending on the actual content being evaluated, making global scoring functions based on meta-tags sub-optimal, and content-specific ones difficult to estimate.

As the foregoing illustrates, what is needed in the art is a more efficient and accurate mechanism for identifying digital media that is similar to digital media that was previously viewed by a user.

SUMMARY OF THE INVENTION

One embodiment of the invention sets forth a method for identifying two or more similar items within a local catalogue. The method includes the step of determining a set of global counts based on interaction data associated with a global group of users, where a first global count in the set of global counts indicates a number of times the global group of users has interacted with a first item in a global catalogue, and a second global count in the set of global counts indicates a number of times the global group of users has interacted with a second item in the global catalogue after interacting with the first item. The method also includes the step of determining a set of local counts based on interaction data associated with a local group of users, where a first local count in the set of local counts indicates a number of times the local group of users has interacted with a third item in a local catalogue, and a second local count in the set of local counts indicates a number of times the local group of users has interacted with a fourth item in the local catalogue after interacting with the third item, and where the third item corresponds to the first item and the fourth item corresponds to the second item. Further, the method includes the steps of combining the set of global counts and the set of local counts to compute an interaction probability that indicates the likelihood of a particular user within the local group of users interacting with the fourth item after interacting with the third item and computing a similarity score that indicates the similarity between the third item and the fourth item based on the interaction probability and a popularity score associated with the fourth item.

One advantage of the disclosed technique is that it generates more accurate digital content recommendations to a user by basing similarities on viewing patterns across a global group of users.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
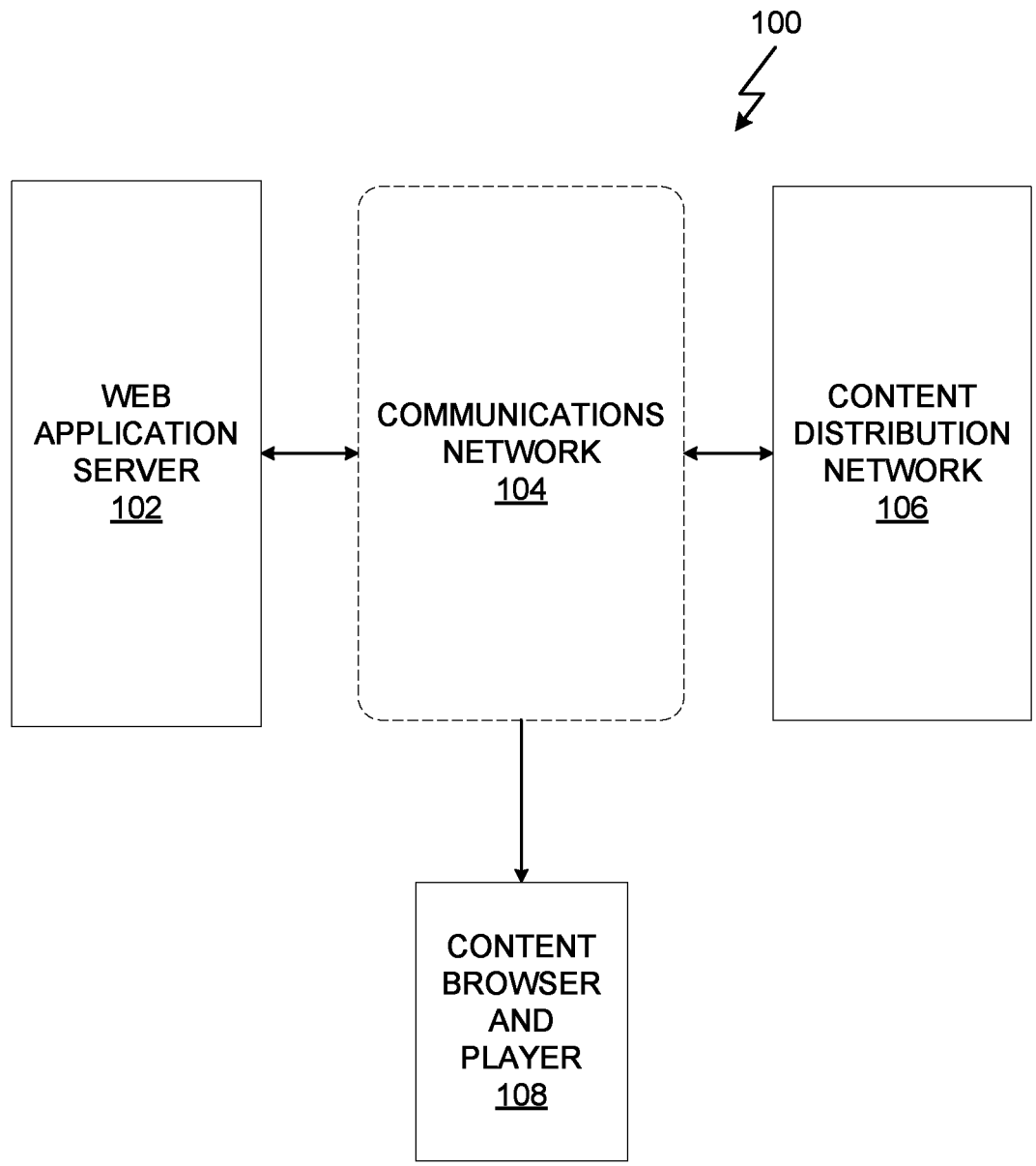
FIG. 1 illustrates a content browsing and distribution system configured to implement one or more aspects of the invention.

FIG. 1 illustrates a content browsing and distribution system 100 configured to implement one or more aspects of the invention. As shown, the content browsing and distribution system 100 includes a web application server 102, a communications network 104, a content distribution network (CDN) 106 and a content browser and player 108.

The communications network 104 includes a plurality of network communications systems, such as routers and switches, configured to facilitate data communication between the web application server 102, the CDN 106 and the content browser and player 108. Persons skilled in the art will recognize that many technically feasible techniques exist for building the communications network 104, including technologies practiced in deploying the well-known internet communications network.

The web application server 102 is a computer system configured to host a web application that is accessed by the content browser and player 108. The web application hosted by the web application server 102 allows a user of content browser and player 108 to browse through available digital content, manage account information, receive content recommendations, etc. One embodiment of the content recommendation functionality, i.e., content similarity based recommendation, is discussed in greater detail below in conjunction with FIGS. 2-4.

The CDN 106 comprises one or more computer systems configured to serve download requests for digital media (referred to "digital content items" herein) from the content browser and player 108. The digital content items may reside on a mass storage system accessible to the computer system. The mass storage system may include, without limitation, direct attached storage, network attached file storage, or network attached block-level storage. The digital content items may be formatted and stored on the mass storage system using any technically feasible technique. A data transfer protocol, such as the well-known hyper-text transfer protocol (HTTP), may be used to download digital content items from the content server 106 to the content browser and player 108.

The content browser and player 108 may comprise a computer system, a set top box, a mobile device such as a mobile phone, or any other technically feasible computing platform that has network connectivity and is coupled to or includes a display device and speaker device for presenting video frames, and generating acoustic output, respectively. The content browser and player 108 interacts with the web application server 102 and the CDN 106 to display available digital content information, gather user preferences and play digital content items.

Although, in the above description, the content browsing and distribution system 100 is shown with one content browser and player 108 and one CDN 106, persons skilled in the art will recognize that the architecture of FIG. 1 contemplates only an exemplary embodiment of the invention. Other embodiments may include any number of content browser and players 108 and/or CDNs 106. Thus, FIG. 1 is in no way intended to limit the scope of the present invention in any way.

Figure 2:
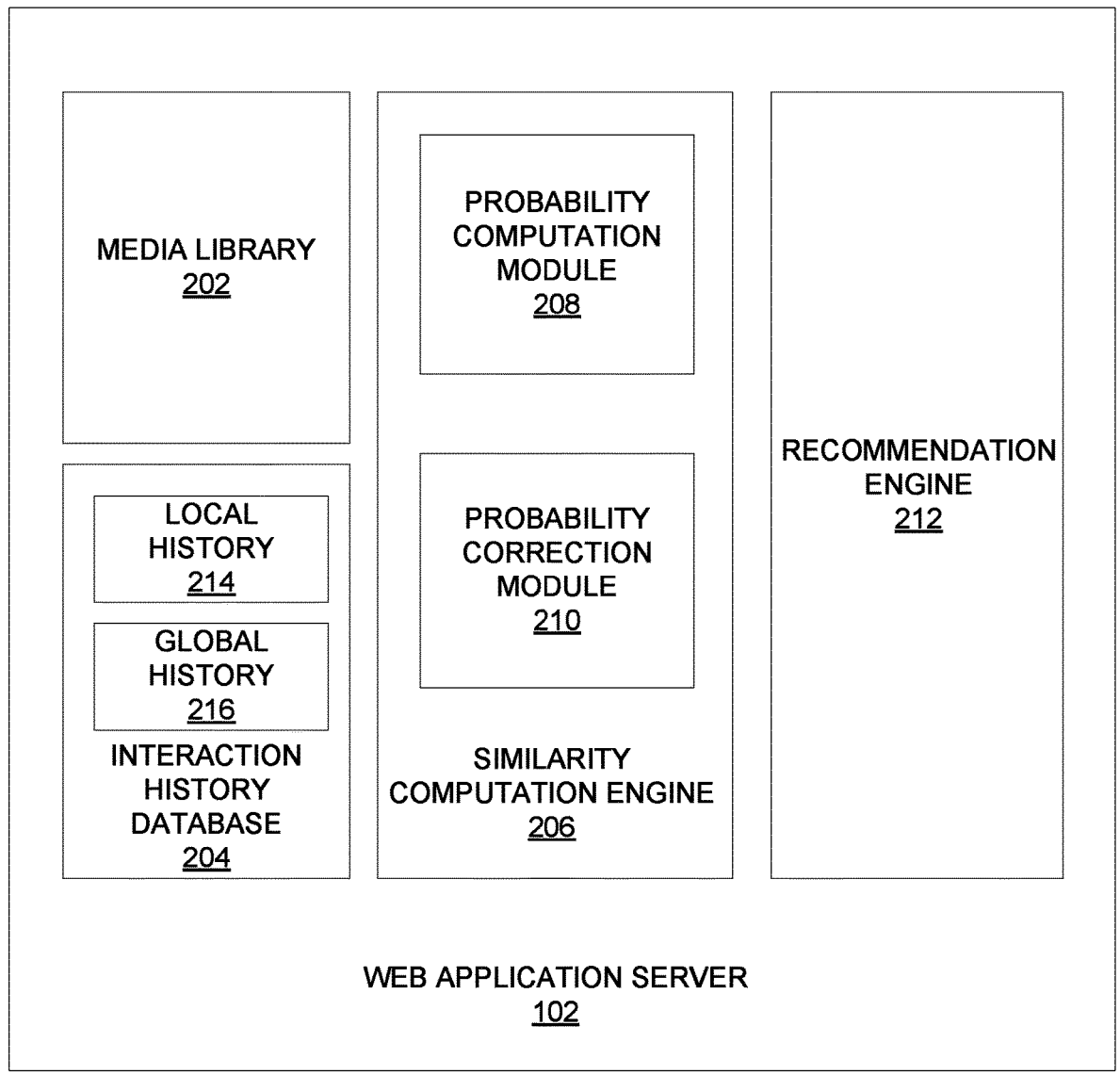
FIG. 2 is a more detailed illustration of the web application server of FIG. 1, according to one embodiment of the invention.

FIG. 2 is a more detailed illustration of the web application server 102 of FIG. 1, according to one embodiment of the invention. As shown, the web application server 102 includes a media library 202, interaction history database 204, a similarity computation engine 206 and a recommendation engine 212.

The media library 202 includes a list of digital content items with which users of the web application server interact. An interaction with a digital content item includes a user action on an item, such as viewing the digital content item, rating the digital content item, adding an item to a set of items of interest (such as a preference queue), searching for an item in a search engine, or even clicking or otherwise navigating to a more detailed description of an item. Any combination of different interaction types would also fit the framework described here.

Digital content items may include video data, such as movies, image data, such as photographs, or audio data, such as songs. Persons skilled in the art would understand that any other digital content items are within the scope of the present invention, and the recommendation and similarity determination techniques described herein can be applied to any such digital content items. In one embodiment, the media library 202 includes only references to digital content items that are stored within the CDN 106 for distribution to users, such as the user of the content browser and player 108.

The interaction history database 204 stores the interaction history related to users of the content browsing and distribution system 100. In the case of the content browser and player 108, each time a user interacts with a particular digital content item via the content browser and player 108, the interaction is recorded in the interaction history database 204. In one embodiment, along with information identifying the user and the particular digital content item, the recorded interaction also include the time and date when each interaction started, and the duration that the user interacted with the digital content item. For other interaction types, the strength of the interaction is stored. For example, if the interaction is a rating, then the actual rating value is stored rather than an interaction duration. Based on recorded interactions, a comprehensive interaction history of the user can be determined. For example, based on two consecutive recorded interactions, the interaction history of the user indicates which digital content item the user chose to interact with after a particular digital content item.

Interaction histories stored in the interaction history database 204 are divided into local history 214 and global history 216. Local history 214 stores recorded interactions associated with users in a current locale, e.g., a country, a city, etc. Global history 214 stores interactions associated with users who are not in the current locale, e.g., users in a different country.

The similarity computation engine 206, for a particular digital item, identifies other digital items that are statistically similar to the particular digital item. The statistical similarity between two digital items is determined based on the interaction histories related to users who have interacted with those digital items. As described below, the probability computation module 208 and probability correction module 210 included in the similarity computation engine 206 operate in conjunction to identify statistically similar digital content items.

The probability computation module 208 computes, for each unique digital content item identified by the media library 202, an interaction probability that indicates the likelihood of that digital content being interacted with by the user after the user interacts with a particular digital content item. To account for a small local history 214 for a particular locale, the probability computation module 208 mixes interactions in the global history 216 with interactions in the local history 214 to compute the interaction probability.

The computation of an interaction probability indicating the likelihood that a user interacts with item j after interacting with item i using both the local history 214 and the global history 216 is described in greater detail below. The computation is divided into three stages, (i) computing effective interaction counts based on the global history 216 and the local history 214, (ii) computing an interaction probability based on the effective interaction counts and (iii) correcting the transition probability for noise.

In the first stage, the probability computation module 208 first filters the global history 216 to remove interactions related to digital content items that are not included in the local catalogue, i.e., the list of digital content items available to users in the current locale. Based on the filtered global history 216, the probability computation module 208 determines two global counts, (i) the total number of times users have interacted with item i and (ii) the total number of times users have interacted with item j after interacting with item i. The probability computation module 208 then computes a global interaction probability based on the two counts. Such a computation is performed via the following equation:

$$P_{ij}^g = \frac{\eta_{ij}^g}{d_i^g} \quad \text{(Equation 1)}$$

where, $P_{ij}^g$ is the interaction probability that digital content item j is interacted with after digital content item i, given that a user has interacted with digital content item i. Further, $\eta_{ij}^g$ is the count of interactions of digital content item j after digital content item i has been interacted with based on the interaction histories stored in the filtered global history 216, and $d_i^g$ is the total count of interactions of digital content item i based on the interactions histories stored in the filtered global history 216.

The probability computation module 208 also determines two local counts, (i) the total number of times users have interacted with item i, $d_i^l$, and (ii) the total number of times users have interacted with item j after interacting with item i, $\eta_{ij}^l$, based on the local history 214.

In one embodiment, the interactions that are included in the counts $\eta_{ij}^g$ and $\eta_{ij}^l$ are weighted according to several metrics. Such metrics include the duration that the digital content items i and j were interacted with, the separation in time between interacting with the digital content item i and the digital content item j, the genre similarity between the digital content item i and digital content item j, and/or any other technically feasible metric.

Next, the probability computation module 208 combines the global interaction probability and the global and local counts to compute effective interaction counts that account for both the local history 214 and the global history 216. In operation, probability computation module 208 first computes an overlap ratio based on the total number of digital content items in the global catalogue that overlap with the local catalogue, $N_g$, and the total number of digital content items in the local catalogue, $N_l$. The overlap ratio is computed via the following equation:

$$\gamma = \frac{N_g}{N_l} \quad \text{(Equation 2)}$$

The probability computation module 208 then computes effective interaction counts based on $P_{ij}^g$, $\gamma$, $d_i^g$, $d_i^l$ using the following equations:

$$\eta_{ij}^{eff} = \eta_{ij}^l + \gamma \left( P_{ij}^g \times \frac{K d_i^g}{K + d_i^g} \right) \quad \text{(Equation 3)}$$

$$d_i^{eff} = d_i^l + \frac{K d_i^g}{K + d_i^g} \quad \text{(Equation 4)}$$

where $\eta_{ij}^{eff}$ is the count of interactions of digital content item j after digital content item i has been interacted with based on the interaction histories stored in the filtered global history 216 and local history 214. Further, $d_i^{eff}$ is the count of interactions of digital content item i based on the interactions histories stored in the filtered global history 216 and the local history 214. K is a parameter that controls the rate of mixing between the filtered global history 216 and local history 214.

In one embodiment, counts collected from various global regions contribute to the effective counts computed using Equations 3 and 4. In such an embodiment, multiple global counts are combined and each global count may have a different rate of mixing, i.e., a different value for K.

In the second stage, the probability computation module 208 computes an effective interaction probability, $P_{ij}^{eff}$. $P_{ij}^{eff}$ Indicates the likelihood that a user interacts with item j after interacting with item i based on the effective interaction counts computed in the first stage. The computation of $P_{ij}^{eff}$ is performed via the following equation:

$$P_{ij}^{eff} = \frac{\eta_{ij}^{eff}}{d_i^{eff}} \quad \text{(Equation 5)}$$

In the third stage, the probability correction module 210 corrects the effective interaction probability, $P_{ij}^{eff}$, to account for the popularity of digital content item j and any other noise in the interaction history. To correct for the popularity of digital content item j, the probability correction module 210 first computes the effective probability of a user randomly interacting with item j over any item in the catalog, $P_j^{eff}$. Such a computation is performed via the following set of equations:

$$d_j^{eff} = d_j^l + \frac{K d_j^g}{K + d_j^g} \quad \text{(Equation 6)}$$

$$\eta_j^{eff} = \eta^l + \gamma \left( P_j^g \times \frac{K d_j^g}{K + d_j^g} \right) \quad \text{(Equation 7)}$$

$$P_j^{eff} = \frac{\eta_j^{eff}}{d_j^{eff}} \quad \text{(Equation 8)}$$

where $d_j^l$ is the count of interactions of digital content item j based on the interactions histories stored in the local history 214. Further, $d_j^g$ is the count of interactions of digital content item j based on the interactions histories stored in the filtered global history 216 and $d_j^{eff}$ is the count of interactions of digital content item j based on the interactions histories stored in the filtered global history 216 and the local history 214. Finally, $\eta_j^{eff}$ is the effective total count of interactions of digital content item j based on the interactions histories stored in the filtered global history 216 and the local history 214.

Once $P_j^{eff}$ is computed, the probability correction module 210 computes a similarity score indicating the similarity of item i and item j. The probability correction module 210 utilizes the following equation to compute the similarity score:

$$OR_{ij} = \frac{P_{ij}^{\mathit{eff}}}{P_j^{\mathit{eff}}} \quad \text{(Equation 9)}$$

where $OR_{ij}$, termed the odds ratio, is the similarity score of digital content item i and digital content item j that is corrected for the popularity of digital content item j. Further, $P^{\mathit{eff}}_{ij}$ is the effective interaction probability computed by the interaction probability computation module 208 and $P^{\mathit{eff}}_j$ is the probability that digital content item j will be interacted with at random.

To correct for noise from low counts in the interaction probability computation, the probability correction module 210 then utilizes the following equation:

$$COR_{ij} = OR_{ij}\left(1 + \frac{1}{d_j^{\mathit{eff}}} - 2\sqrt{\mu}\right) \quad \text{(Equation 10)}$$

where $COR_{ij}$ is the corrected odds ratio, the similarity score between digital content item i and digital content item j that is corrected for the popularity of digital content item j and noise. Here $OR_{ij}$ is the odds ratio, or similarity score corrected for popularity, and μ is the noise. In one embodiment, the noise μ is computed via the following equation:

$$\mu \cong \frac{1}{\eta_{ij}^{\mathit{eff}}} - \frac{1}{d_j^{\mathit{eff}}} + \frac{1}{d_j^{\mathit{eff}}} - \left(\frac{1}{d_j^{\mathit{eff}}}\right)^2 \quad \text{(Equation 11)}$$

The probability computation module 208 and the probability correction module 210 operate in conjunction to compute a similarity score for each unique pair of digital content items identified by the media library 202 using Equations 1-11 above. The similarity scores $COR_{ij}$ for different digital content items j are ordered in decreasing order, where the digital content item j associated with the most positive $COR_{ij}$ is the most similar to digital content item i. Also, a digital content item j associated with a $COR_{ij}$ that is less than one is dissimilar to digital content item i as digital content item j is more likely to be interacted with after digital content item i randomly than because of a statistical similarity computed based on interaction histories.

The recommendation engine 212 recommends digital content items to users of the content browsing and distribution system 100, such as the user of content browser and player 108, based, at least in part, on the similarity scores computed by the similarity computation engine 206. More specifically, when a user interacts with digital content item i, the recommendation engine 212, recommends digital content items j associated similarity scores $COR_{ij}$ that are above a pre-determined threshold. In such a manner, a user is presented with recommendations of digital content items that are determined to be statistically similar to a digital content item with which the user has interacted.

In one embodiment, the computations described above are performed for each pair of items i and j based on interaction histories from periods of time when both items were available to the users. Interaction histories from periods of time when only one of the two items are available are ignored. Such temporal correction enhances the accuracy of the similarity scores.

In one embodiment, the interaction probabilities computed by the probability computation module 208 are organized into a Markov Chain. In such an embodiment, the Markov Chain is modified to account for the variability of the digital content items being available to the users of the content browsing and distribution system 100. In operation, when computing the interaction probabilities for a pair of digital content items, the probability computation module 208 only accesses interaction history data stored in the interaction history database 204 that corresponds to the period of time when both digital content items were available in the media library 202.

The operation of the similarity computation engine 206 as described above can be applied to a multitude of interactions, such as views, purchases, etc. In addition, any type of interaction, including viewing of items, can be recorded and used as a basis of computing the probabilities and similarity scores discussed above.

Figure 3:
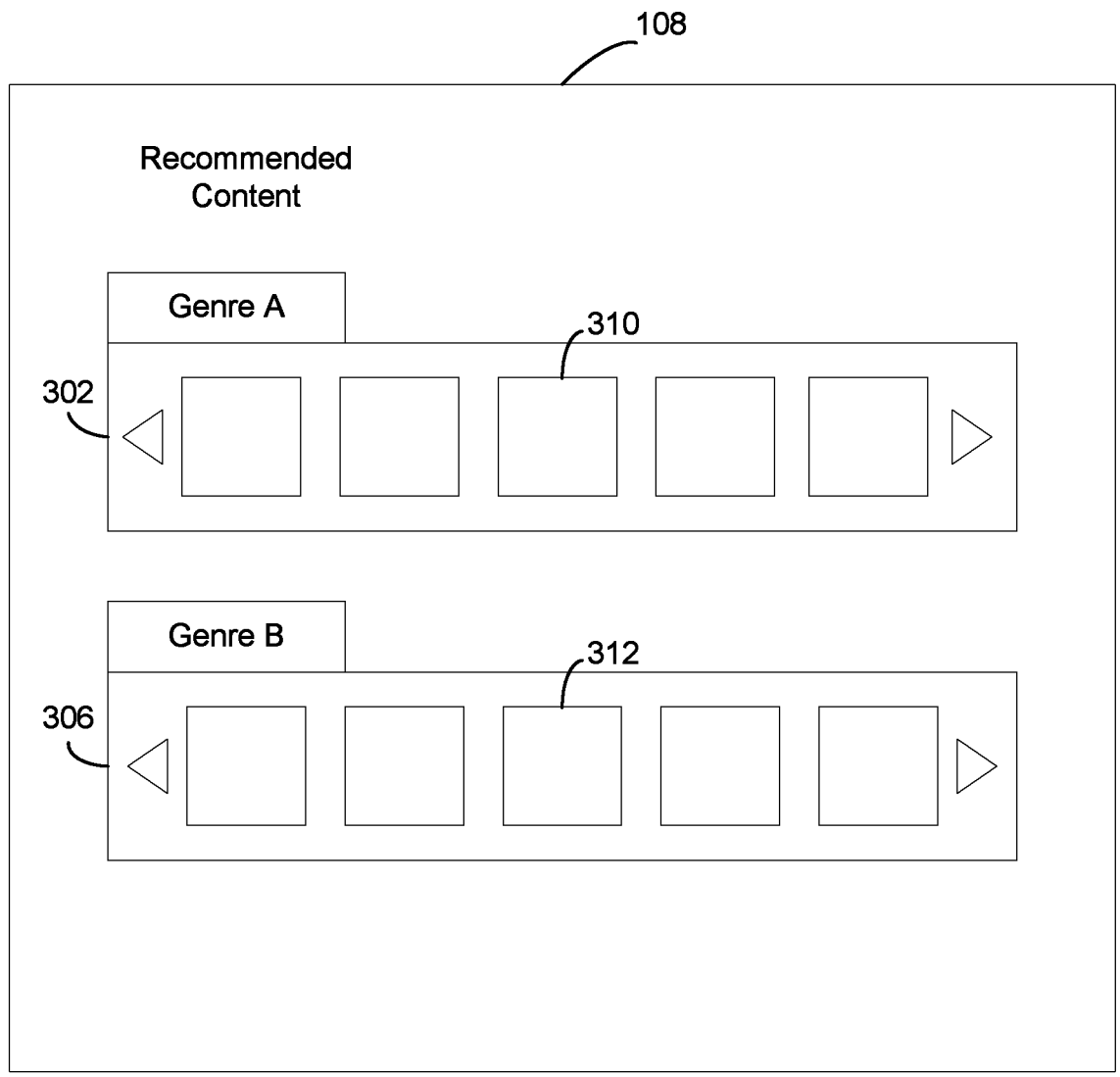
FIG. 3 is a conceptual diagram illustrating recommended digital content items displayed in the content browser and player of FIG. 1, according to one embodiment of the invention.

FIG. 3 is a conceptual diagram illustrating recommended digital content items displayed in the content browser and player 108 of FIG. 1, according to one embodiment of the invention. As shown, the content browser and player 108 includes row 302 and row 306 associated with genres A and B, respectively. Digital content 310 included in row 302 and digital content 312 included in row 306 is recommended to the user of content browser and player 108 based on a similarity detected between a digital content item that was previously-interacted with by the user. The similarity is detected based on the techniques of the similarity computation engine 206 described previously herein.

Figure 4:
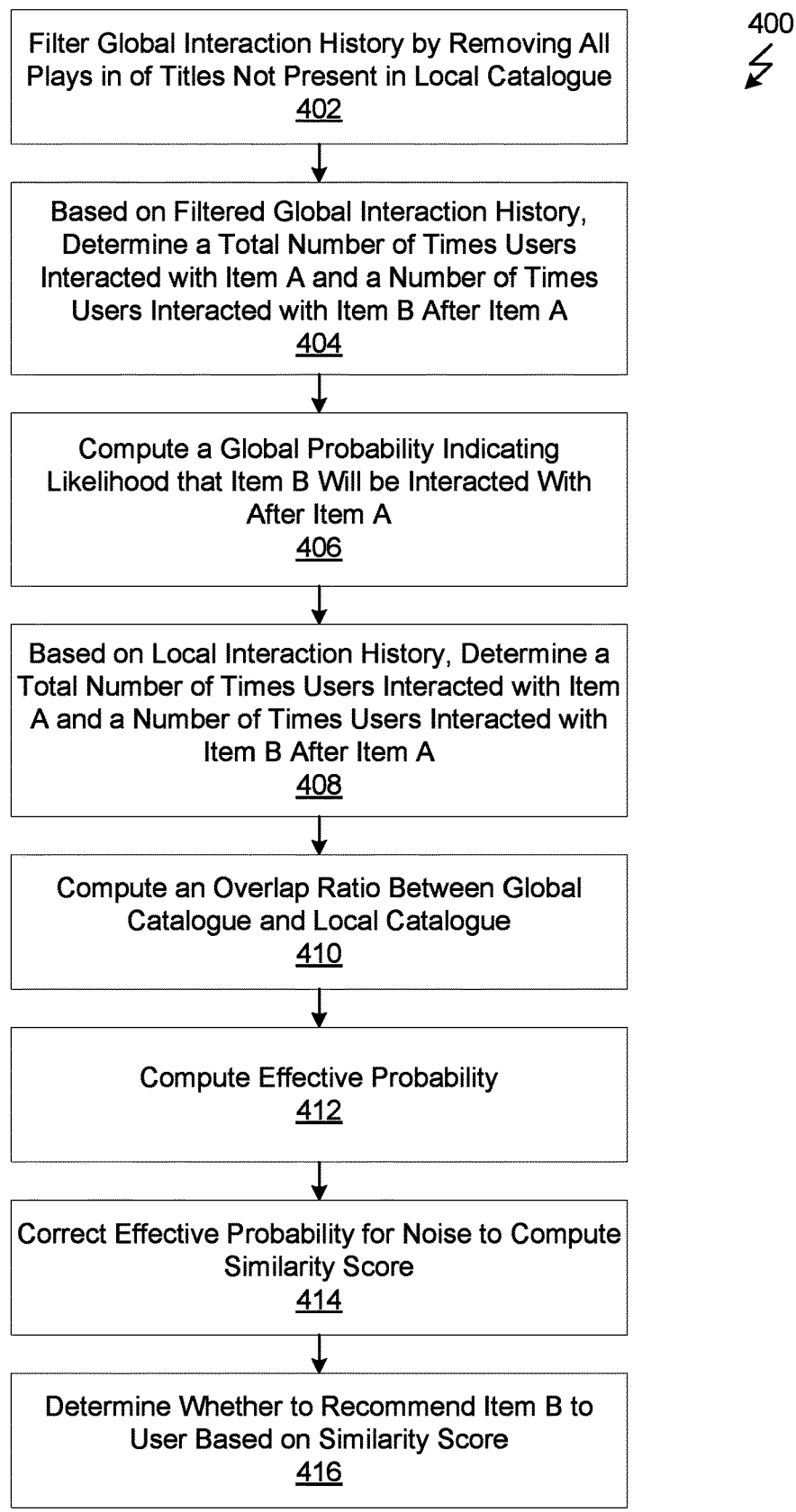
FIG. 4 is a flow diagram of method steps for determining the similarity score between a first item and a second item, according to one embodiment of the invention.

FIG. 4 is a flow diagram of method steps for determining the similarity score between a first item and a second item, according to one embodiment of the invention. Although the method steps are described in conjunction with the systems for FIGS. 1-2, persons skilled in the art will understand that any system configured to perform the method steps, in any order, is within the scope of the invention.

The method 400 begins at step 402, where the probability computation module 208 filters the global history 216 to remove interactions related to digital content items that are not included in the local catalogue. At step 404, based on the filtered global history 216, the probability computation module 208 determines two global counts, (i) the total number of times users have interacted with item A, $d^g_a$, and (ii) the total number of times users have interacted with item B after interacting with item A, $\eta^g_{ab}$.

At step 406, the probability computation module 208 computes a global interaction probability, $P^g_{ab}$, based on $d^g_a$ and $\eta^g_{ab}$ using Equation 1 above. The global interaction probability indicates the likelihood that a user would interact with item B after interacting with item A. At step 408, the probability computation module 208 determines two local counts, (i) the total number of times users have interacted with item A, $d^l_a$, and (ii) the total number of times users have interacted with item B after interacting with item A, $\eta^l_{ab}$, based on the local history 214.

At step 410, the probability computation module 208 computes an overlap ratio based on the total number of digital content items in the global catalogue, $N_g$, and the total number of digital content items in the local catalogue $N_l$. At step 412, the probability computation module 208 computes an effective interaction probability, $P^{\mathit{eff}}_{ab}$, using Equations 2-5 described above. $P^{\mathit{eff}}_{ab}$ indicates the likelihood that a user interacts with item j after interacting with item i based on $\eta^l_{ab}$, $d^l_a$, $P^g_{ab}$ and the overlap ratio.

At step 414, the probability correction module 210 corrects the interaction probability computed at step 412 for noise. To correct the interaction probability for noise caused by the popularity of item B, the probability correction module 210 utilizes Equations 6-8 as described above. The probability correction module 210 also applies a noise function to the interaction probability corrected for the popularity of item B to compute a similarity score that indicates a similarity between the first item and the second item. Equations 10-11 used by the probability computation module 208 to apply the noise function to the corrected probability are described above.

Once the similarity score that indicates the similarity between the item A and item B is computed, at step 416, the recommendation 212 can determine whether to recommend the item B to a user when the user has previously interacted with item A. In one embodiment, when the similarity score is above a pre-determined threshold, item A and item B are deemed to be sufficiently similar and the second item is recommended to the user.

In sum, a similarity score between two digital items is computed based on interaction histories associated with global users and interaction histories associated with local users. Global counts indicating the number of interactions associated with each unique pair of digital items are weighted based on a mixing rate. The weighted global counts are then combined with local counts to compute total counts. An effective interaction probability indicating the likelihood of a user interacting with one digital item in the pair of digital items after interacting with the other digital item is computed based on the total counts. The effective interaction probability is then corrected for noise resulting in a similarity score that indicates the similarity between the pair of digital items. The similarity score between different pairs of digital items are evaluated to identify which digital items are to be recommended to a user.

One advantage of the disclosed technique is that it generates more accurate digital content recommendations to a user by basing similarities on viewing patterns across a global group of users.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method, the method comprising:
in response to a user interacting with a first digital content item included in a local catalogue via a content browser, generating, at a web server computing system, a web application interface that includes a plurality of interface elements, wherein each interface element included in the plurality of interface elements is individually selectable when the web application interface is displayed;
identifying, at the web server computing system, a different digital content item for each interface element included in the plurality of interface elements, wherein a second digital content item identified for a first interface element included in the plurality of interface elements is identified by:
determining a local count associated with the first digital content item based on first interaction data associated with a local group of users including the user, wherein the local count indicates a number of times the local group of users has interacted with a second digital content item in the local catalogue after interacting with the first digital content item,
determining a global count associated with the first digital content item based on second interaction data associated with a global group of users, wherein the global count indicates a number of times the global group of users has interacted with the second digital content item after interacting with the first digital content item,
combining the local count and the global count based on a popularity associated with the second digital content item to compute an interaction probability that indicates a likelihood of a particular user within the local group of users interacting with the second digital content item after interacting with the first digital content item,
modifying the interaction probability based on a noise associated with the popularity of the second digital content item, a noise in the first interaction data, or a noise in the second interaction data; and
identifying, based on the modified interaction probability, the second digital content item for presentation within a first interface element in the plurality of interface elements; and
transmitting, from the web server computing system to the content browser, the web application interface in order to present the first digital content item within the first interface element, wherein the first interface element is selectable when the web application interface is displayed within the content browser.

2. The method of claim 1, further comprising filtering the interaction data associated with the global group of users to remove data related to items that are not included in the local catalogue.

3. The method of claim 1, wherein combining the global count and the local count comprises determining a mixing rate that indicates a weight applied to the interaction data associated with a global group of users.

4. The method of claim 3, wherein combining the global count and the local count comprises computing a global probability that indicates a likelihood that a global user within the global group of users would interact with the second item after interacting with the first item.

5. The method of claim 4, wherein combining the global count and the local count further comprises computing a local probability that indicates a likelihood that a local user within the local group of users would interact with a given item after interacting with a previously-presented item.

6. The method of claim 5, wherein combining the global count and the local count further comprises weighting the global probability according to the mixing rate, and then combining the local probability and the weighted global probability to compute the interaction probability.

7. The method of claim 1, wherein the popularity associated with the second digital item indicates a likelihood that the particular user would randomly interact with the given item.

8. The method of claim 1, wherein identifying the second digital content item comprises computing a similarity score that indicates the similarity between the first digital content item and the second digital content item based on the interaction probability and the popularity associated with the second digital content item, wherein the second digital content item is identified for presentation within the first interface element based on the similarity score.

9. The method of claim 8, wherein computing the similarity score comprises computing a ratio of the interaction probability and a popularity score.

10. The method of claim 8, further comprising applying a noise correction function to the similarity score to filter the data that was captured in a set of global counts or a set of local counts.

11. One or more non-transitory computer readable media storing instructions that, when executed by one or more processors, cause the one or more processors to performs the steps of:
  in response to a user interacting with a first digital content item included in a local catalogue via a content browser, generating, at a web server computing system, a web application interface that includes a plurality of interface elements, wherein each interface element included in the plurality of interface elements is individually selectable when the web application interface is displayed;
  identifying, at the web server computing system, a different digital content item for each interface element included in the plurality of interface elements, wherein a second digital content item identified for a first interface element included in the plurality of interface elements is identified by:
    determining a local count associated with the first digital content item based on first interaction data associated with a local group of users including the user, wherein the local count indicates a number of times the local group of users has interacted with a second digital content item in the local catalogue after interacting with the first digital content item,
    determining a global count associated with the first digital content item based on second interaction data associated with a global group of users, wherein the global count indicates a number of times the global group of users has interacted with the second digital content item after interacting with the first digital content item,
    combining the local count and the global count based on a popularity associated with the second digital content item to compute an interaction probability that indicates a likelihood of a particular user within the local group of users interacting with the second digital content item after interacting with the first digital content item,
    modifying the interaction probability based on a noise associated with the popularity of the second digital content item, a noise in the first interaction data, or a noise in the second interaction data; and
  identifying, based on the modified interaction probability, the second digital content item for presentation within a first interface element in the plurality of interface elements; and
  transmitting, from the web server computing system to the content browser, the web application interface in order to present the first digital content item within the first interface element, wherein the first interface element is selectable when the web application interface is displayed within the content browser.

12. The one or more non-transitory computer readable media of claim 11, further comprising filtering the interaction data associated with the global group of users to remove data related to items that are not included in the local catalogue.

13. The one or more non-transitory computer readable media of claim 11, wherein combining the global count and the local count comprises determining a mixing rate that indicates a weight applied to the interaction data associated with a global group of users.

14. The one or more non-transitory computer readable media of claim 13, wherein combining the global count and the local count comprises computing a global probability that indicates a likelihood that a global user within the global group of users would interact with the second item after interacting with the first item.

15. The one or more non-transitory computer readable media of claim 14, wherein combining the global count and the local count further comprises computing a local probability that indicates a likelihood that a local user within the local group of users would interact with a given item after interacting with a previously-presented item.

16. The one or more non-transitory computer readable media of claim 15, wherein combining the global count and the local count further comprises weighting the global probability according to the mixing rate, and then combining the local probability and the weighted global probability to compute the interaction probability.

17. The one or more non-transitory computer readable media of claim 11, wherein the popularity associated with the second digital item indicates a likelihood that the particular user would randomly interact with the given item.

18. The one or more non-transitory computer readable media of claim 11, wherein identifying the second digital content item comprises computing a similarity score that indicates the similarity between the first digital content item and the second digital content item based on the interaction probability and the popularity associated with the second digital content item, wherein the second digital content item is identified for presentation within the first interface element based on the similarity score.

19. The one or more non-transitory computer readable media of claim 18, wherein computing the similarity score comprises computing a ratio of the interaction probability and a popularity score.

20. A computer system, comprising:
  a memory storing one or more instructions; and
  a server computing system configured to execute the one or more instructions to:
    in response to a user interacting with a first digital content item included in a local catalogue via a content browser, generating, at a web server computing system, a web application interface that includes a plurality of interface elements, wherein each interface element included in the plurality of interface elements is individually selectable when the web application interface is displayed;

identifying, at the web server computing system, a different digital content item for each interface element included in the plurality of interface elements, wherein a second digital content item identified for a first interface element included in the plurality of interface elements is identified by:

determining a local count associated with the first digital content item based on first interaction data associated with a local group of users including the user, wherein the local count indicates a number of times the local group of users has interacted with a second digital content item in the local catalogue after interacting with the first digital content item, determining a global count associated with the first digital content item based on second interaction data associated with a global group of users, wherein the global count indicates a number of times the global group of users has interacted with the second digital content item after interacting with the first digital content item, combining the local count and the global count based on a popularity associated with the second digital content item to compute an interaction probability that indicates a likelihood of a particular user within the local group of users interacting with the second digital content item after interacting with the first digital content item, modifying the interaction probability based on a noise associated with the popularity of the second digital content item, a noise in the first interaction data, or a noise in the second interaction data, and identifying, based on the modified interaction probability, the second digital content item for presentation within a first interface element in the plurality of interface elements; and transmitting, from the web server computing system to the content browser, the web application interface in order to present the first digital content item within the first interface element, wherein the first interface element is selectable when the web application interface is displayed within the content browser.

\* \* \* \* \*